United States Patent
Andreu et al.

(10) Patent No.: US 11,424,546 B2
(45) Date of Patent: Aug. 23, 2022

(54) MODIFIED GROUND PLANES TO INCREASE GAINS IN ELEMENT PATTERNS OF GEODESIC ANTENNAS

(71) Applicant: Raytheon Company, Waltham, MA (US)

(72) Inventors: Allen J. Andreu, Tampa, FL (US); James W. Culver, Seminole, FL (US); Carlos R. Costas, Brandon, FL (US); Daniel P. Jones, Pinellas Park, FL (US); Ryan C. Lewandowski, Palm Harbor, FL (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/110,020

(22) Filed: Dec. 2, 2020

(65) Prior Publication Data
US 2022/0173516 A1   Jun. 2, 2022

(51) Int. Cl.
*H01Q 13/02*  (2006.01)
*H01Q 21/20*  (2006.01)
*H04B 3/52*   (2006.01)
*H01Q 13/12*  (2006.01)

(52) U.S. Cl.
CPC ............. *H01Q 13/02* (2013.01); *H01Q 13/12* (2013.01); *H01Q 21/205* (2013.01); *H04B 3/52* (2013.01)

(58) Field of Classification Search
CPC ....... H01Q 13/02; H01Q 13/12; H01Q 21/205
See application file for complete search history.

(56) References Cited

U.S. PATENT DOCUMENTS

| 8,279,604 B2    | 10/2012 | Jones et al.           |
| 9,219,309 B2    | 12/2015 | Costas et al.          |
| 2014/0022126 A1* | 1/2014  | Costas ........ H01Q 3/26 342/377 |

OTHER PUBLICATIONS

Cramer, "Geodesic Cone Antenna", Mar. 1984, 25 pages.
Yean, "Analysis and Design of a Wideband Multibeam Array", Thesis Submitted for the Degree of PH.D. of Engineering, Department of Electrical and Computer Engineering, National University of Singapore, 2010, 147 pages.
Hacking, "A New Class of 360 Degree Scanning Antenna—The Geolenray Antenna*", 1967, 7 pages.
Andreu et al., "Mitigation of Ripple in Element Pattern of Geodesic Antenna", U.S. Appl. No. 17/105,099, filed Nov. 25, 2020, 21 pages.

(Continued)

*Primary Examiner* — Hoang V Nguyen

(57) ABSTRACT

A geodesic antenna includes an outer cone. The geodesic antenna also includes an inner cone positioned partially within the outer cone and, together with the outer cone, defining an electromagnetic waveguide. The geodesic antenna further includes multiple driven elements configured to generate electromagnetic waves in a space between the outer and inner cones. In addition, the geodesic antenna includes a ground plane configured to reflect first electromagnetic waves of the generated electromagnetic waves back into the space between the outer and inner cones. The ground plane has a geometric design that prevents at least some second electromagnetic waves of the generated electromagnetic waves from being reflected from the ground plane and forming an interferometer pattern.

20 Claims, 9 Drawing Sheets

(56) References Cited

OTHER PUBLICATIONS

Demmerle et al., "A Biconical Multibeam Antenna for Space-Division Multiple Access", IEEE Transactions on Antennas and Propagation, vol. 46, No. 6, Jun. 1998, 6 pages.

Emadeddin et al., "A Compact Ultra-Wideband Multibeam Antenna System", IEEE Transactions on Antennas and Propagation, vol. 66, No. 1, Nov. 2017, 7 pages.

International Search Report and Written Opinion of the International Searching Authority dated Feb. 18, 2022 in connection with International Patent Application No. PCT/US2021/060047, 12 pages.

* cited by examiner

MODIFIED GROUND PLANES TO INCREASE GAINS IN ELEMENT PATTERNS OF GEODESIC ANTENNAS

TECHNICAL FIELD

This disclosure is generally directed to geodesic antennas. More specifically, this disclosure is directed to modified ground planes to increase gains in element patterns of geodesic antennas.

BACKGROUND

Geodesic antennas are antennas in which their antenna elements contribute to beam patterns in all degrees in azimuth. Some geodesic antennas include cones that help to direct electromagnetic energy, where the cones define lens apertures of the geodesic antennas. Geodesic lens apertures have many advantages, including simplicity of design. Due to their ease of construction and design, geodesic lens apertures are well-suited for applications that require 360° coverage in azimuth. However, electromagnetic energy is typically provided at one end of a cone, and some of the electromagnetic energy in the form of geodesic rays can combine on the other side of the cone and create an interferometer pattern. This interferometer pattern causes phase disturbances that complicate functions such as beam steering calculations and can result in formed beams with higher side lobes.

SUMMARY

This disclosure provides modified ground planes to increase gains in element patterns of geodesic antennas.

In a first embodiment, a geodesic antenna includes an outer cone. The geodesic antenna also includes an inner cone positioned partially within the outer cone and, together with the outer cone, defining an electromagnetic waveguide. The geodesic antenna further includes multiple driven elements configured to generate electromagnetic waves in a space between the outer and inner cones. In addition, the geodesic antenna includes a ground plane configured to reflect first electromagnetic waves of the generated electromagnetic waves back into the space between the outer and inner cones. The ground plane has a geometric design that prevents at least some second electromagnetic waves of the generated electromagnetic waves from being reflected from the ground plane and forming an interferometer pattern.

In a second embodiment, a method includes generating electromagnetic waves in a space between outer and inner cones of a geodesic antenna. The method also includes using a ground plane of the geodesic antenna to reflect first electromagnetic waves of the generated electromagnetic waves back into the space between the outer and inner cones. The ground plane has a geometric design that prevents at least some second electromagnetic waves of the generated electromagnetic waves from being reflected from the ground plane and forming an interferometer pattern.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 9B, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, some geodesic antennas include cones that help to direct electromagnetic energy, where the cones define lens apertures of the geodesic antennas. However, electromagnetic energy is typically provided at one end of a cone, and some of the electromagnetic energy in the form of geodesic rays can combine on the other side of the cone and create an interferometer pattern. This interferometer pattern causes phase disturbances that complicate functions such as beam steering calculations and can result in formed beams with higher side lobes.

This disclosure provides various modified ground planes that can be used in geodesic antennas. As described in more detail below, each modified ground plane reflects electromagnetic energy generated in a geodesic antenna. Using geometric manipulations of a ground plane, electromagnetic energy can be trapped or reflected at a steeper angle relative to the scan angle of a geodesic antenna (where the steeper angle of reflection also helps to trap the electromagnetic energy). As a result, this electromagnetic energy has reduced or minimized impact and does not contribute significantly to the overall output beam produced by the geodesic antenna. In this way, the interferometer pattern of the geodesic antenna can be diminished, which helps to increase the gain in the element pattern of the geodesic antenna. This can also help to limit the phase ripples in the geodesic antenna, which results in simplified phase calculations for the geodesic antenna. This can further help to lower side lobes when forming the output beam. In addition, operations such as beam steering calculations can be simplified since they do not have to account for the interferometer secondary effects.

Figure 1:
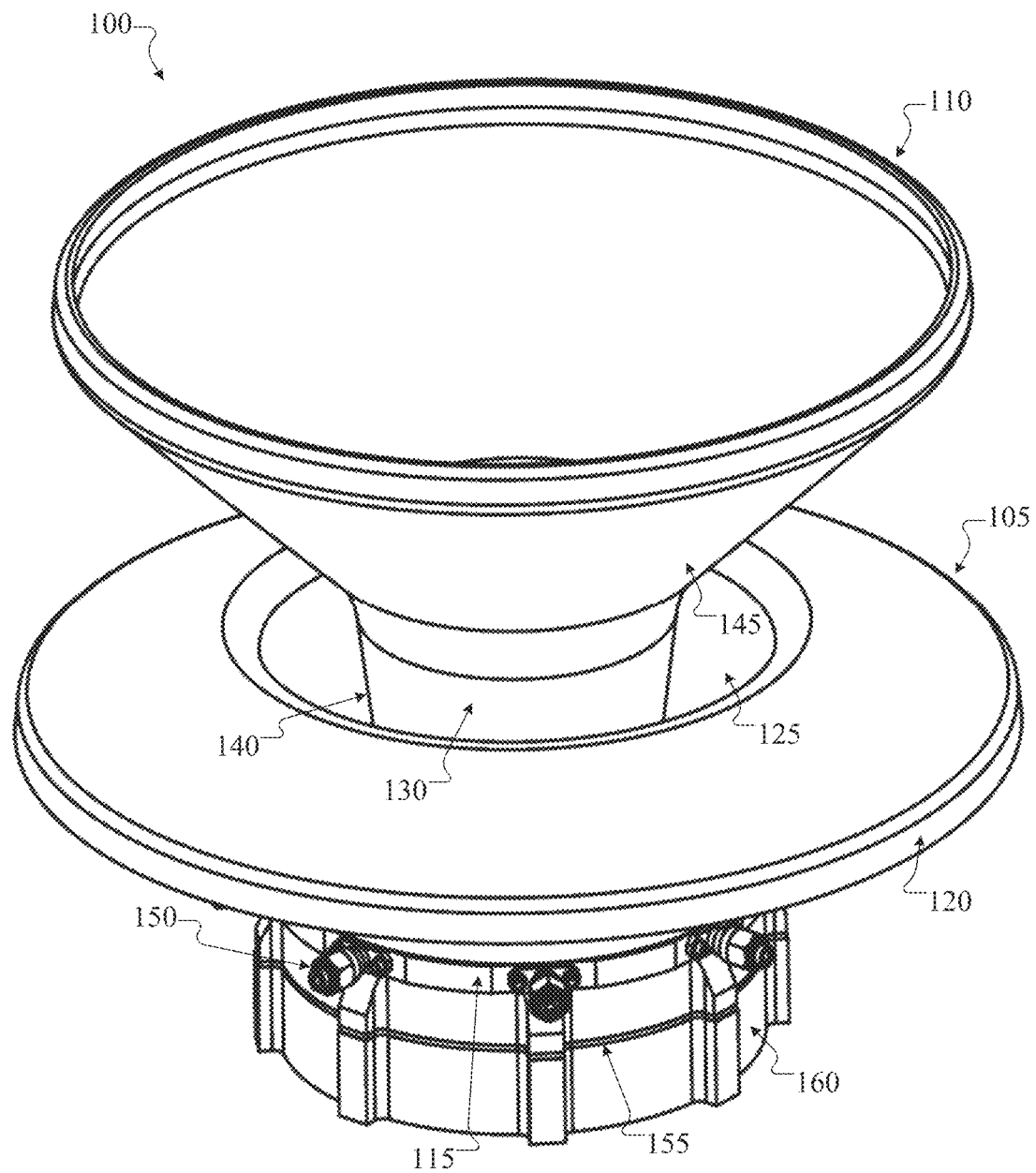
FIGS. 1 through 3 illustrate an example geodesic antenna in accordance with this disclosure.
Figure 2:
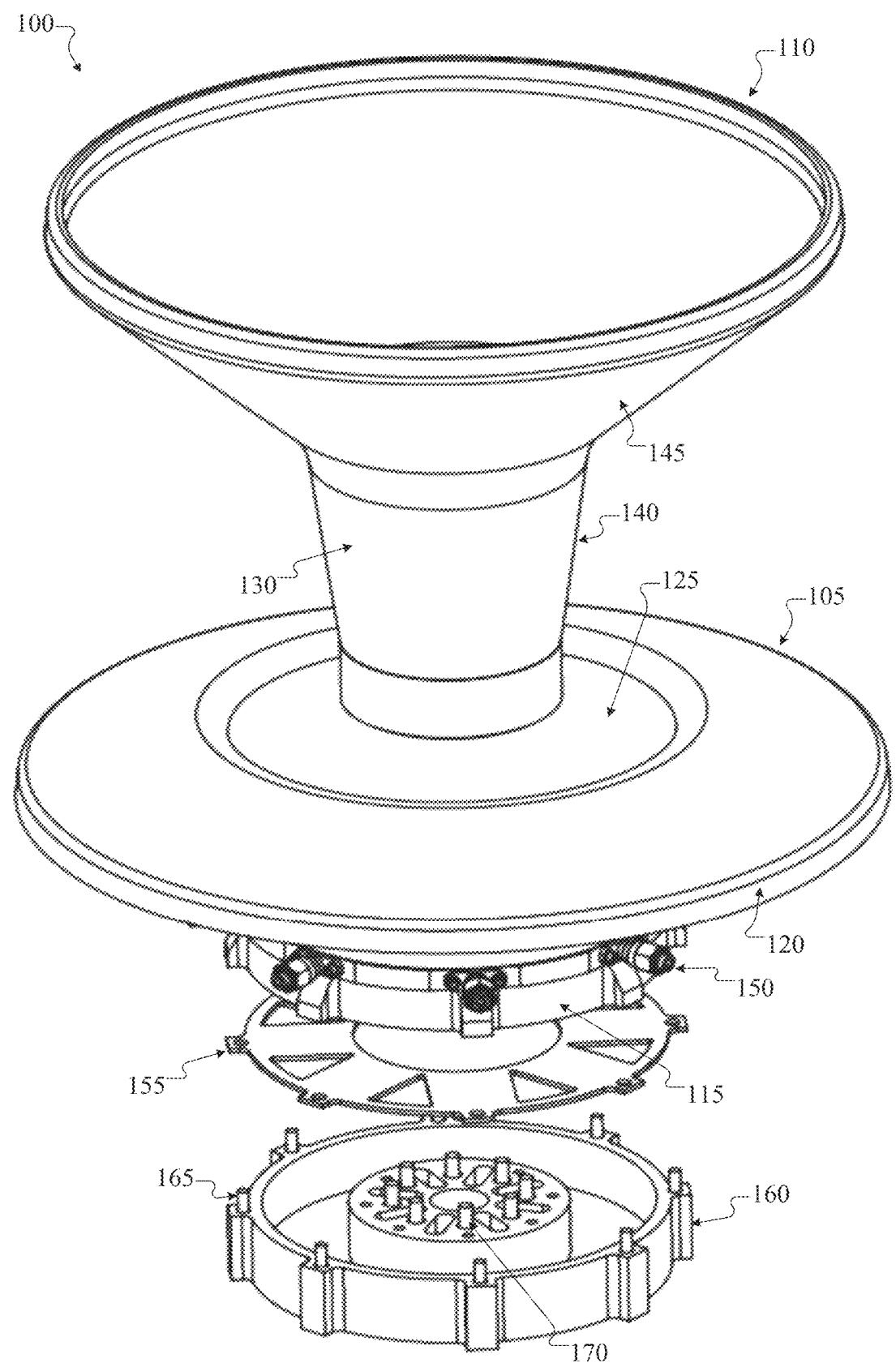
Figure 3:
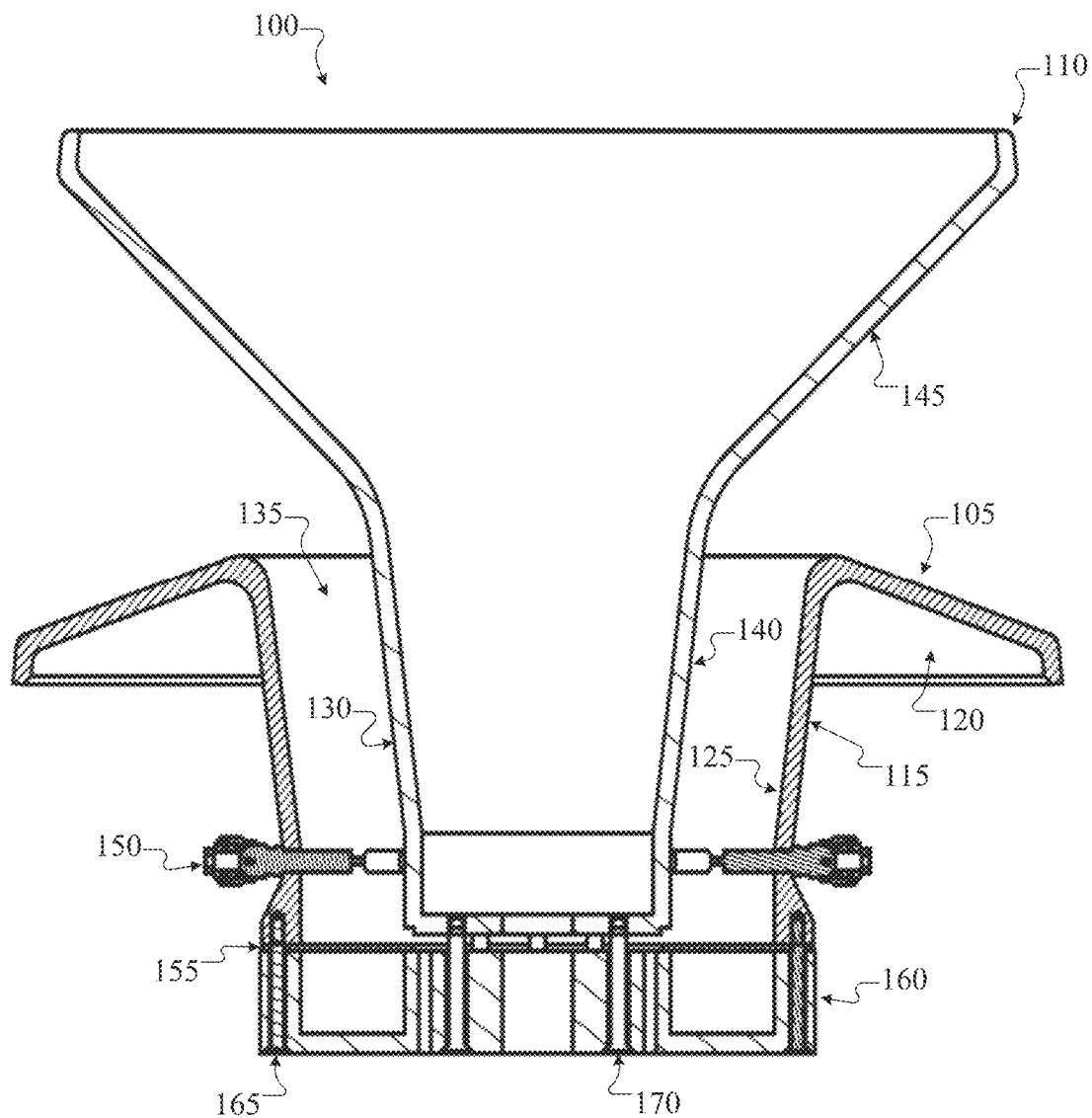

FIGS. 1 through 3 illustrate an example geodesic antenna 100 in accordance with this disclosure. More specifically, FIG. 1 illustrates a perspective view of the geodesic antenna 100, FIG. 2 illustrates an exploded view of the geodesic antenna 100, and FIG. 3 illustrates a cross-sectional view of the geodesic antenna 100. The embodiment of the geodesic antenna 100 in FIGS. 1 through 3 is for illustration only, and a geodesic antenna 100 may have any other suitable element pattern.

As shown in FIGS. 1 through 3, the geodesic antenna 100 is formed using nested geodesic lens antennas (GLAs), which are referred to as "cones." In the illustrative embodiment of FIGS. 1 through 3, the geodesic antenna 100 includes an outer cone 105 and an inner cone 110. The outer cone 105 and the inner cone 110 are concentric to act as a parallel plate waveguide. While more than two cones can be used in the geodesic antenna 100, the relationship between the outer cone 105 and the inner cone 110 will be described for simplicity, and the relationship between the outer cone 105 and the inner cone 110 can be extended for more than two cones. For example, an additional outer cone may be concentric with the inner cone 110 and with the outer cone 105 to act as a parallel plate waveguide.

The outer cone 105 is configured to receive a portion of the inner cone 110 within an interior space of the outer cone 105. The outer cone 105 can be formed from any suitable conductive material(s), such as one or more metals. The outer cone 105 can also be formed in any suitable manner, such as casting, injection molding, metal spinning, or metal turning. In addition, the outer cone 105 can have any suitable size, shape, and dimensions. In this example, the outer cone 105 is formed as a hollow generally cylindrical structure 115 that is at least partially enclosed at one end. The circumference of an opposite end of the outer cone 105 has a flared portion 120 protruding away in a radial direction from a central axis of the outer cone 105. A surface of the flared portion 120 is at a reflex angle (greater than 180°) from an inside surface 125 of the outer cone 105.

A portion of the inner cone 110 is inserted into the outer cone 105, and another portion of the inner cone 110 extends above the outer cone 105. The inner cone 110 can be formed from any suitable conductive material(s), such as one or more metals. The conductive material(s) of the inner cone 110 can be the same as or different from the conductive material(s) of the outer cone 105. The inner cone 110 can also be formed in any suitable manner, such as casting, injection molding, metal spinning, or metal turning. In addition, the inner cone 110 can have any suitable size, shape, and dimensions. In this example, the inner cone 110 is formed as a hollow generally cylindrical structure 130, at least a portion of which fits within the outer cone 105. Inserting the inner cone 110 into the outer cone 105 forms an annulus 135 between the inside surface 125 of the outer cone 105 and an outside surface 140 of the inner cone 110. The circumference of an opposite end of the inner cone 110 has a flared portion 145 protruding away in a radial direction from a central axis of the inner cone 110. A surface of the flared portion 145 is at an oblique angle (less than or more than 90°) relative to the outside surface 140 of the inner cone 110.

The outer cone 105 and the inner cone 110 create a geodesic parallel plate waveguide as conformal structures, such as a pair of conic sections. The inner cone 110 is coupled within the outer cone 105 to form the parallel waveguide, which is formed between the inside surface 125 of the outer cone 105 and the outside surface 140 of the inner cone 110. The inside surface 125 of the outer cone 105 and the outside surface 140 of the inner cone 110 represent opposing plates of the waveguide. Note that while both the inner cone 110 and the outer cone 105 are described as having the same shape (a generally hollow cylinder with a flared end portion), the shapes of the outer cone 105 and the inner cone 110 can be different.

As noted above, the flared portion 120 of the outer cone 105 can extend at a reflex angle from the top of the inside surface 125 of the outer cone 105, and the flared portion 145 of the inner cone 110 can extend at an oblique angle from the top of the outside surface 140 of the inner cone 110. The flared portion 120 of the outer cone 105 and the flared portion 145 of the inner cone 110 can focus a resulting waveguide radiation element pattern. The structures of the flared portions 120 and 145 allow for omnidirectional waveguide radiation element patterns.

Each of multiple driven elements 150 is coupled to the outer cone 105 and extends into the annulus 135 between the inside surface 125 of the outer cone 105 and an outside surface 140 of the inner cone 110. Each driven element 150 is connected to a transmitter or receiver, such as by using a transmission line. When a driven element 150 is implemented in a transmitting geodesic antenna 100, the driven element 150 is driven by a radio frequency (RF) signal from the transmitter, which causes the driven element 150 to generate electromagnetic energy in the form of RF waves within the annulus 135. The phase of the RF signal provided to each of the driven elements 150 can vary depending on the desired direction of an output beam to be transmitted by the geodesic antenna 100. When a driven element 150 is implemented in a receiving geodesic antenna 100, the driven element 150 converts electromagnetic energy in the form of RF waves collected within the annulus 135 into electrical currents, which are provided to the receiver. Each of the driven elements 150 may represent a quarter-wavelength feed probe or other feed probe.

At least one driven element 150 may be configured to generate at least one primary geodesic ray. The primary geodesic ray(s) from the driven element(s) 150 can generally be focused out of the outer cone 105. However, secondary geodesic rays can be generated as a side effect of the primary geodesic ray(s) interacting with the outside surface 140 of the inner cone 110 and the inside surface 125 of the outer cone 105. Secondary geodesic rays can also be generated based on a general dispersion of a beam. At least one driven element 150 may function as a monopole and also generate a ray in the opposite direction towards a ground plane 155. The ground plane 155 can be implemented as the base in the interior of the outer cone 105 or formed separately and coupled to the outer cone 105.

The ground plane 155 reflects electromagnetic waves from one or more of the driven elements 150, and the reflected electromagnetic waves increase the gain of the primary geodesic ray(s). The ground plane 155 represents a parasitic element that is electromagnetically coupled with the driven elements 150. The primary geodesic ray(s) from one or more driven elements 150 can contribute to the pointing angle within a scan angle of the geodesic antenna 100. For example, the primary geodesic ray(s) can form an element pattern suitable for the specific use of the geodesic antenna 100. The outer cone 105 and the inner cone 110 can be designed with a desired scan angle that affects the gain and size of the geodesic antenna 100. A smaller scan angle provides more gain but may also necessitate a taller geodesic antenna 100. A larger scan angle provides less gain but allows for a smaller compact geodesic antenna 100.

However, without any type of correction, the secondary geodesic rays can wrap around within the annulus 135 between the inner cone 110 and the outer cone 105 and interfere with both the primary geodesic ray(s) generated by the driven element(s) 150 and other secondary rays. This creates an interferometer pattern that can cause phase disturbances, which may complicate functions such as beam steering calculations and can result in formed beams with higher side lobes. Reducing or minimizing the interferometer pattern may be necessary or desirable in order to improve the operation of the geodesic antenna 100.

As described in more detail below, the ground plane 155 is designed to help significantly reduce the interferometer pattern associated with the geodesic antenna 100. This is achieved by designing the ground plane 155 to more effectively trap electromagnetic energy that may form secondary geodesic rays. In some embodiments, the ground plane 155 includes holes that allow electromagnetic waves to pass through the ground plane 155 and be trapped under the ground plane 155. In other embodiments, the ground plane 155 includes prisms or other angled surfaces that reflect electromagnetic waves at steeper angles relative to a simple flat ground plane. Both approaches help to trap secondary geodesic rays more effectively within the geodesic antenna 100, which helps to diminish the interferometer pattern of the geodesic antenna 100. Example embodiments of the ground plane 155 are provided below. The ground plane 155 can be formed from any suitable conductive material(s), such as one or more metals. The ground plane 155 can also be formed in any suitable manner, such as machining. In addition, the ground plane 155 can have any suitable size, shape, and dimensions.

In this example, a base 160 represents a bottom portion of the geodesic antenna 100 and helps to couple various components of the geodesic antenna 100 together. For example, the base 160 can be coupled to the outer cone 105 and the inner cone 110 while securing the ground plane 155 within the geodesic antenna 100. In this particular example, various bolts or other connectors 165 can pass through the base 160 and enter the outer cone 105, which secures the outer cone 105 to the base 160. Similarly, various bolts or other connectors 170 can pass through the base 160 and enter the inner cone 110, which secures the inner cone 110 to the base 160. In addition, as described below, at least some of the connectors 165 or 170 can pass through openings of the ground plane 155 in order to secure the ground plane 155 in place between the base 160 and the outer and inner cones 105, 110. In some embodiments, the base 160 may implement an RF trap that captures and terminates electromagnetic waves entering into the base 160 through the ground plane 155. The base 160 can be formed from any suitable material(s) and in any suitable manner. The base 160 can also have any suitable size, shape, and dimensions.

Note that in some embodiments, it may be a relatively simple task to remove the base 160 from the geodesic antenna 100 and replace the ground plane 155. For example, personnel may only need to remove the connectors 165 and 170, lift the base 160 and the current ground plane 155 off the outer and inner cones 105, 110, replace the current ground plane 155 with another ground plane 155, and reattach the base 160 and the other ground plane 155 to the outer and inner cones 105, 110 using the connectors 165 and 170. Among other things, this may allow the personnel to change the ground planes 155 used with the geodesic antenna 100 as needed or desired, such as to change the antenna performance or tailor the antenna performance to a desired application. However, the ability to change the ground planes 155 in the geodesic antenna 100 is optional and may or may not be supported in any specific implementation of the geodesic antenna 100.

The geodesic antenna 100 and its individual components may have any suitable sizes, shapes, and dimensions. For example, in some embodiments, the geodesic antenna 100 has a total diameter of about nine inches (about 22.86 centimeters) and a total height of about seven inches (about 17.78 centimeters). However, the design of the geodesic antenna 100 can be easily scaled in order to meet the specific requirements of any particular application. The geodesic antenna 100 can also provide 360° coverage in azimuth and support desired beam steering or other beam-related functions. The geodesic antenna 100 here may be used in any suitable applications, such as defense-related or covert applications or other applications in which 360° in azimuth is needed or desired.

Although FIGS. 1 through 3 illustrate one example of a geodesic antenna 100, various changes may be made to FIGS. 1 through 3. For example, the geodesic antenna 100 may have multiple outer cones 105, each with driven elements 150. Also, the geodesic antenna 100 may be used in conjunction with any suitable number(s) and type(s) of external components and systems.

FIGS. 4A through 7C illustrate example modified ground planes 155a-155d that increase gains in element patterns of geodesic antennas in accordance with this disclosure. For ease of explanation, the ground planes 155a-155d shown in FIGS. 4A through 7C are described as being used in the geodesic antenna 100 of FIGS. 1 through 3. However, the ground planes 155a-155d shown in FIGS. 4A through 7C may be used in any other suitable geodesic antennas.

Figure 4A:
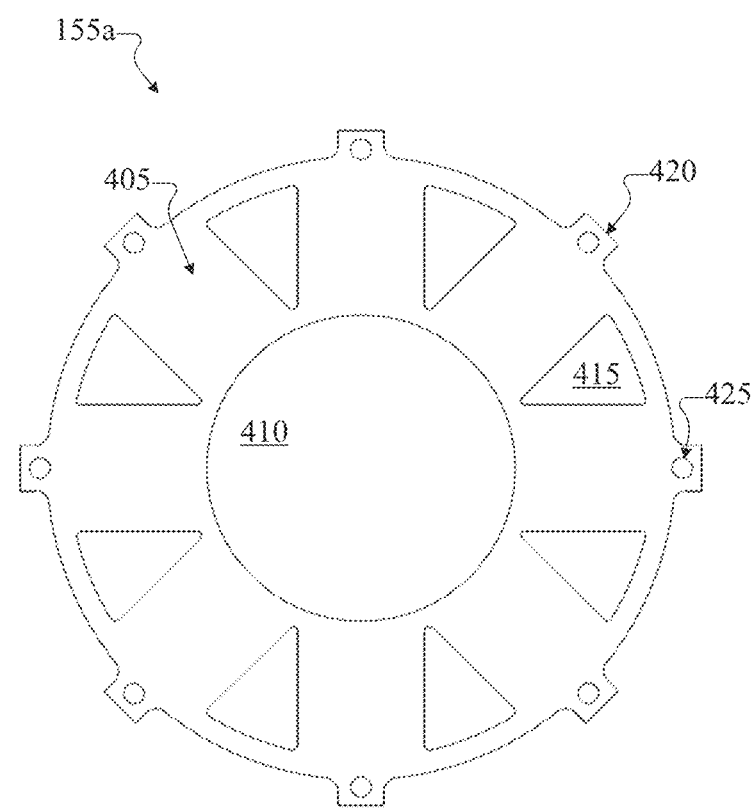
FIGS. 4A through 7C illustrate example modified ground planes that increase gains in element patterns of geodesic antennas in accordance with this disclosure.
Figure 4B:
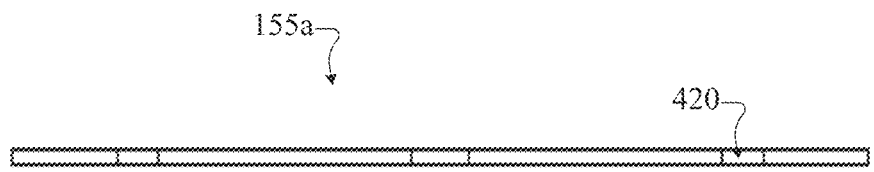

As shown in FIGS. 4A and 4B, a first example embodiment of a ground plane 155a represents a substantially planar annular structure. Here, the ground plane 155a is formed as an annular ring 405 that surrounds an open space 410 within the ring 405. The open space 410 allows, for example, a portion of the base 160 to pass through the ground plane 155a and couple to and support the inner cone 110. The ring 405 includes various openings 415, where each opening 415 passes completely through the ground plane 155a. The openings 415 allow some of the electromagnetic waves directed towards to the ground plane 155a to pass through the ground plane 155a and be trapped using the base 160.

In some embodiments, each opening 415 can be positioned so that it is substantially equidistant or centered between two of the driven elements 150 once the ground plane 155a is secured to the outer and inner cones 105, 110 by the base 160. This may allow, for example, more effective capture of electromagnetic waves that might otherwise form secondary geodesic rays that wrap around the annulus 135. In those embodiments, the number of openings 415 and the positions of the openings 415 can vary based on the number and positions of the driven elements 150. However, any other suitable number and positions of the openings 415 may be used here. In this particular example, each opening 415 is formed as a generally triangular structure with rounded corners and a shorter edge that is slightly curved. However, each opening 415 may have any other suitable form.

Various projections 420 extend from an outer perimeter of the ring 405, and each projection 420 includes an opening 425. Each opening 425 allows one of the connectors 165 to pass through the associated projection 420, which allows the base 160 to be attached to the outer cone 105 and helps secure the ground plane 155a in place. Note, however, that any other suitable mechanism may be used to secure the ground plane 155a in place.

Figure 5A:
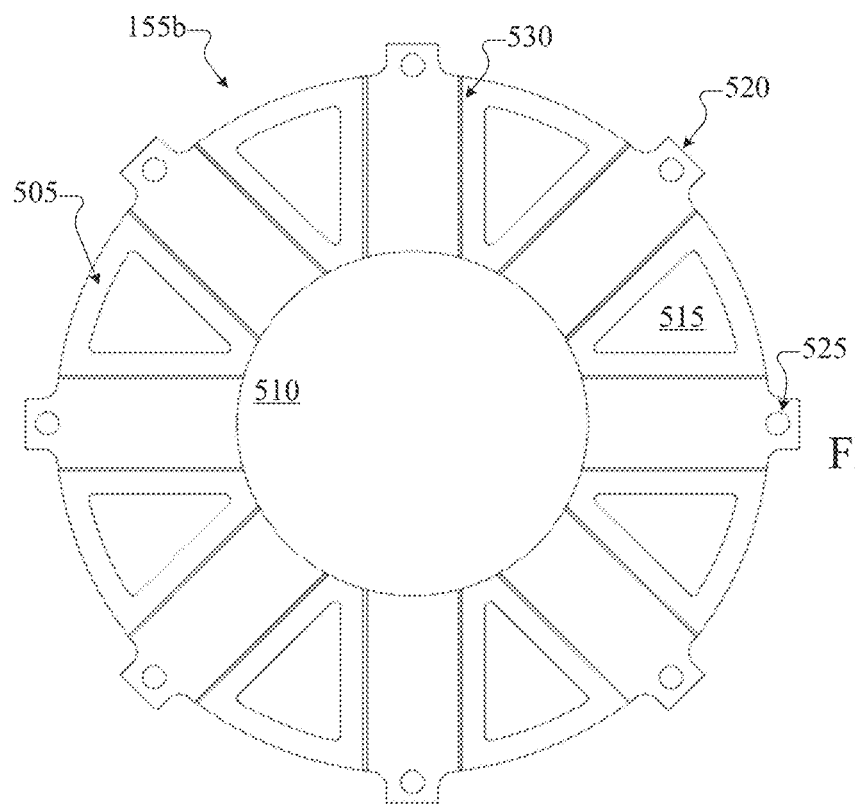
Figure 5B:
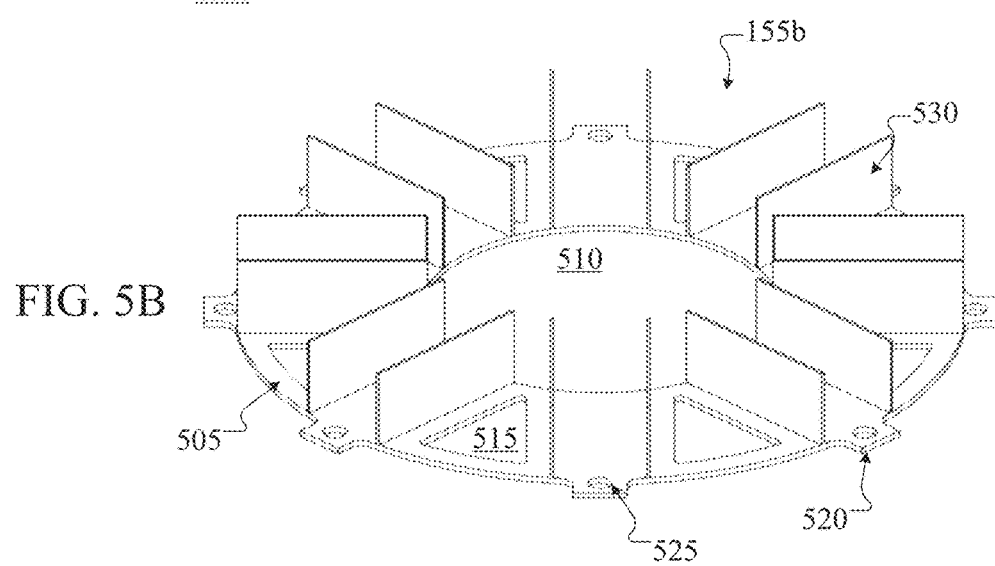
Figure 5C:
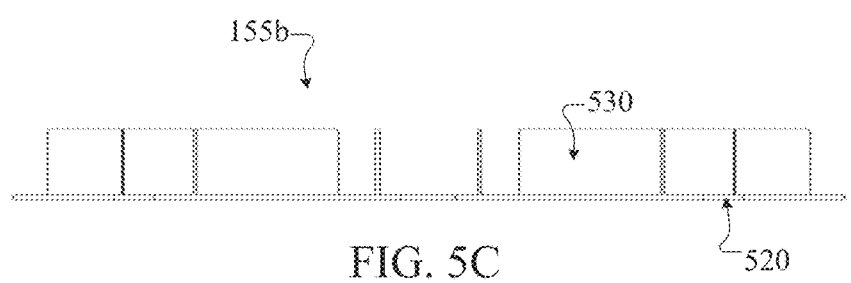

As shown in FIGS. 5A through 5C, a second example embodiment of a ground plane 155b is similar in some respects to the ground plane 155a. For example, the ground plane 155b is formed using an annular ring 505 that surrounds an open space 510 within the ring 505. The ring 505 includes various openings 515, where each opening 515 passes completely through the ground plane 155b. The openings 515 allow some of the electromagnetic waves directed towards to the ground plane 155b to pass through the ground plane 155b and be trapped using the base 160. In some embodiments, each opening 515 can be positioned so that it is substantially equidistant or centered between two of the driven elements 150 once the ground plane 155b is secured to the outer and inner cones 105, 110 by the base 160, and the number of openings 515 and the positions of the openings 515 can vary based on the number and positions of the driven elements 150. However, any other suitable number and positions of the openings 515 may be used here. In this particular example, each opening 515 is formed as a generally triangular structure with rounded corners and a shorter edge that is slightly curved. However, each opening 515 may have any other suitable form. Various projections 520 extend from an outer perimeter of the ring 505, and each projection 520 includes an opening 525. Each opening 525 allows one of the connectors 165 to pass through the associated projection 520, which allows the base 160 to be attached to the outer cone 105 and helps secure the ground plane 155b in place. Note, however, that any other suitable mechanism may be used to secure the ground plane 155b in place.

In addition, the ground plane 155b includes various raised walls 530 that extend upward or otherwise away from the ring 505. In this example, two walls 530 are positioned on opposite sides of each of the openings 515. The walls 530 can help to reflect electromagnetic energy into the openings 515 and/or to reflect electromagnetic energy at a steeper angle compared to the flat ground plane 155a. Either mechanism can help to trap electromagnetic energy within the geodesic antenna 100 that might otherwise form secondary geodesic rays.

Note that each of the walls 530 may be formed integral with the ring 505 or formed separately from and attached to the ring 505. For example, the ring 505 and the walls 530 may be formed by machining a single piece of material or by using an additive manufacturing process, in which case the walls 530 would be integral with the ring 505. In other cases, the ring 505 and walls 530 may be formed separately, and the walls 530 can be welded, bonded, or otherwise attached to the ring 505. Also note that while the walls 530 here are shown as having a uniform height and extending completely across the annular width of the ring 505, other forms for the walls 530 may be used. For instance, the walls 530 may have a height that tapers downward toward the outer edge or the inner edge of the ring 505 or other non-uniform height, or the walls 530 may extend partially (but not completely) across the annular width of the ring 505.

Figure 6A:
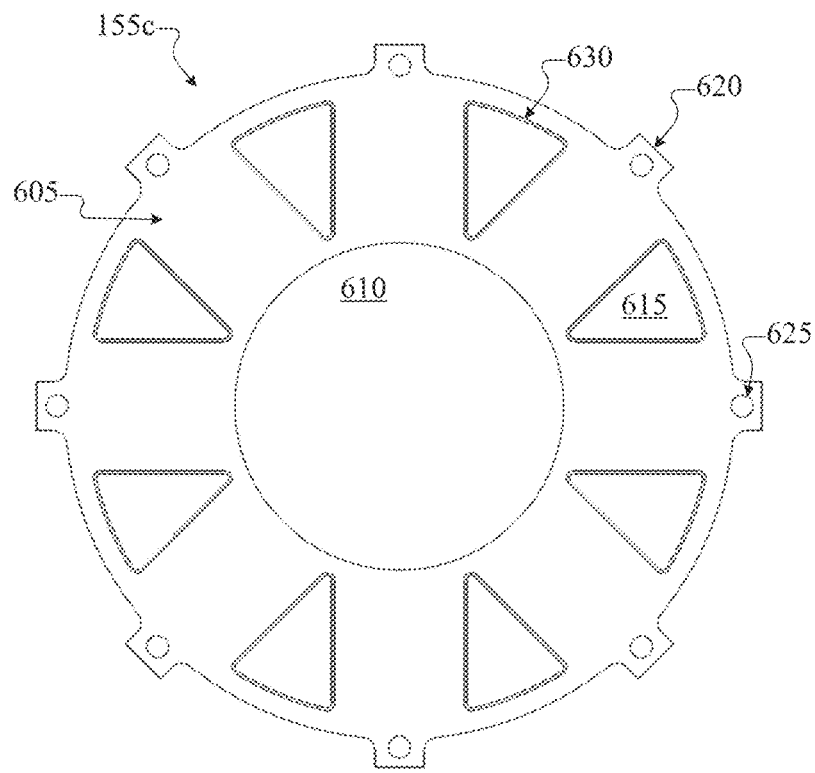
Figure 6B:
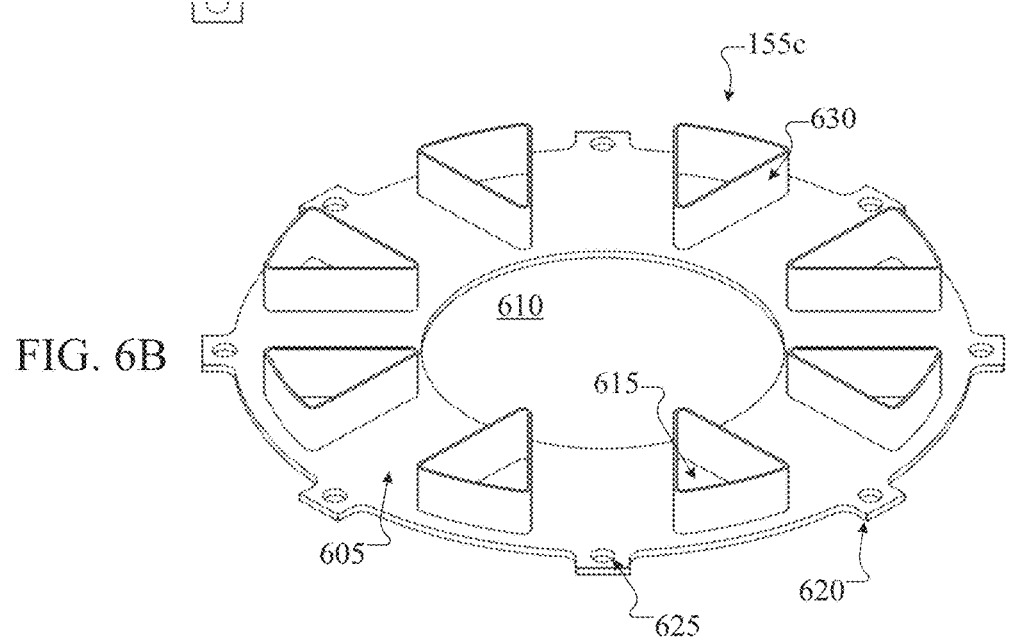
Figure 6C:
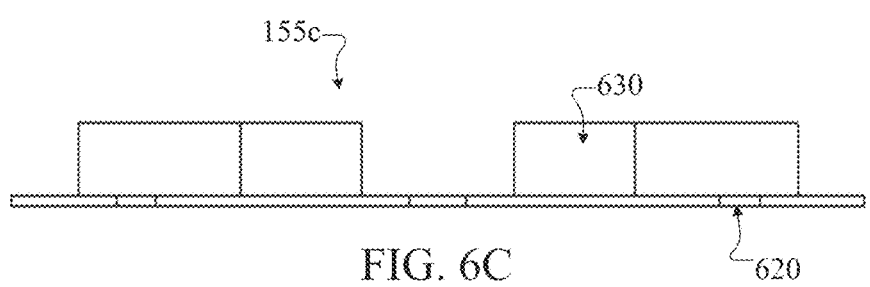

As shown in FIGS. 6A through 6C, a third example embodiment of a ground plane 155c is similar in some respects to the ground planes 155a and 155b. For example, the ground plane 155c is formed using an annular ring 605 that surrounds an open space 610 within the ring 605. The ring 605 includes various openings 615, where each opening 615 passes completely through the ground plane 155c. The openings 615 allow some of the electromagnetic waves directed towards to the ground plane 155c to pass through the ground plane 155c and be trapped using the base 160. In some embodiments, each opening 615 can be positioned so that it is substantially equidistant or centered between two of the driven elements 150 once the ground plane 155c is secured to the outer and inner cones 105, 110 by the base 160, and the number of openings 615 and the positions of the openings 615 can vary based on the number and positions of the driven elements 150. However, any other suitable number and positions of the openings 615 may be used here. In this particular example, each opening 615 is formed as a generally triangular structure with rounded corners and a shorter edge that is slightly curved. However, each opening 615 may have any other suitable form. Various projections 620 extend from an outer perimeter of the ring 605, and each projection 620 includes an opening 625. Each opening 625 allows one of the connectors 165 to pass through the associated projection 620, which allows the base 160 to be attached to the outer cone 105 and helps secure the ground plane 155c in place. Note, however, that any other suitable mechanism may be used to secure the ground plane 155c in place.

In addition, the ground plane 155c includes various raised walls 630 that extend upward or otherwise away from the ring 605. In this example, each wall 630 completely surrounds or encircles an associated one of the openings 615. Again, the walls 630 can help to reflect electromagnetic energy into the openings 615 and/or to reflect electromagnetic energy at a steeper angle compared to the flat ground plane 155a. Either mechanism can help to trap electromagnetic energy within the geodesic antenna 100 that might otherwise form secondary geodesic rays.

Note that each of the walls 630 may be formed integral with the ring 605 or formed separately from and attached to the ring 605. For example, the ring 605 and the walls 630 may be formed by machining a single piece of material or by using an additive manufacturing process, in which case the walls 630 would be integral with the ring 605. In other cases, the ring 605 and walls 630 may be formed separately, and the walls 630 can be welded, bonded, or otherwise attached to the ring 605. Also note that while the walls 630 here are shown as having a uniform height and extending completely around the associated openings 615, other forms for the walls 630 may be used. For instance, the walls 630 may have a height that tapers downward toward the outer edge or the inner edge of the ring 605 or other non-uniform height, or the walls 630 may extend partially (but not completely) around the associated openings 615.

Figure 7A:
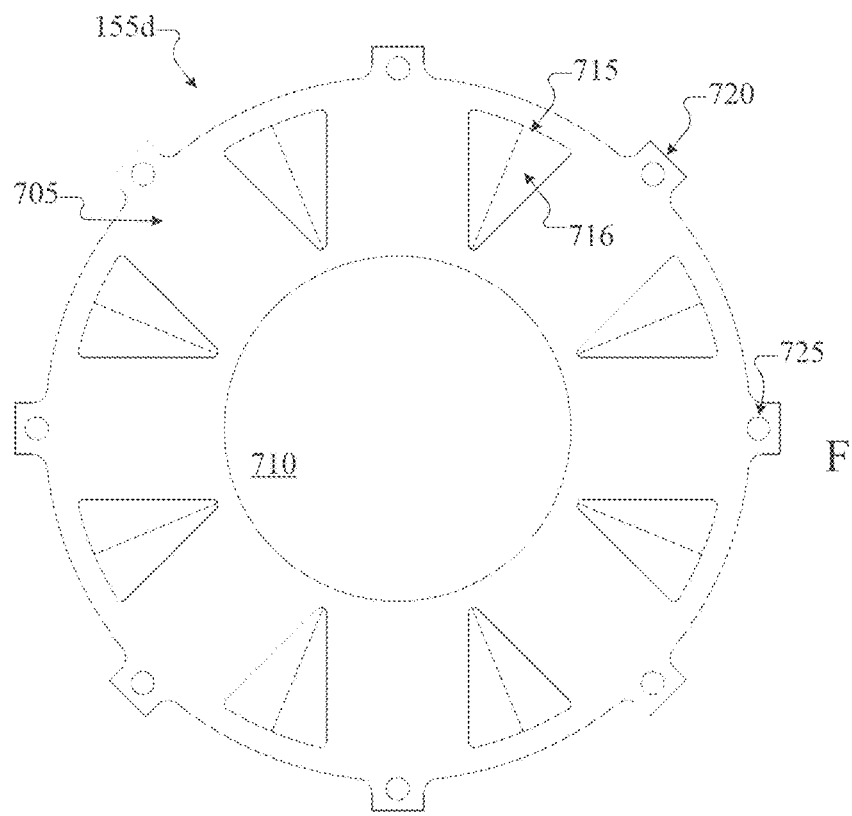
Figure 7B:
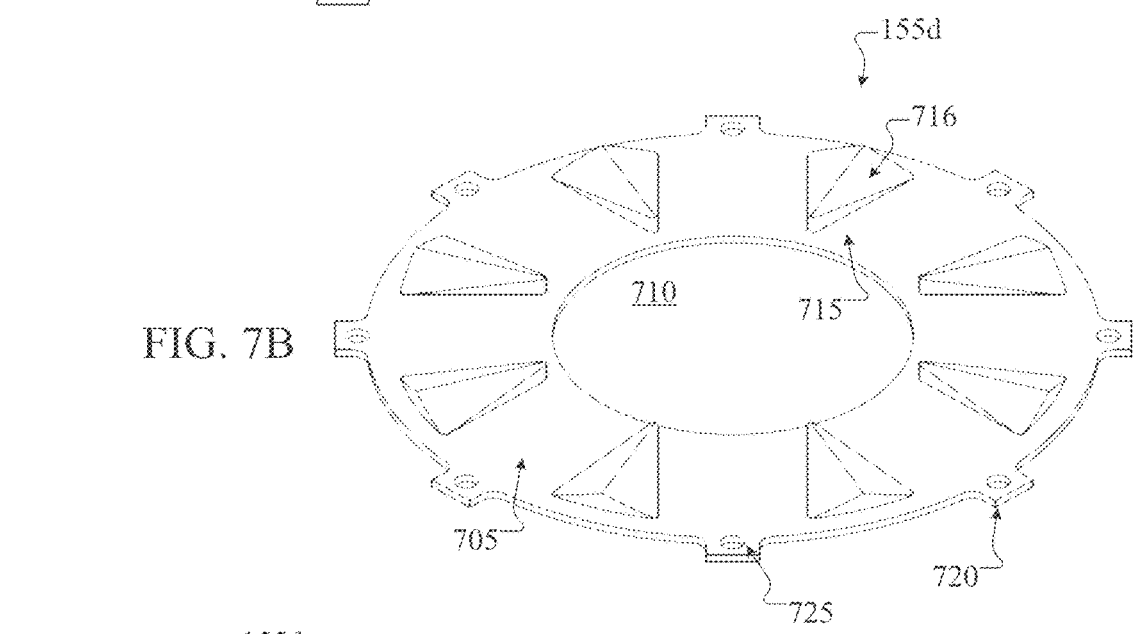
Figure 7C:
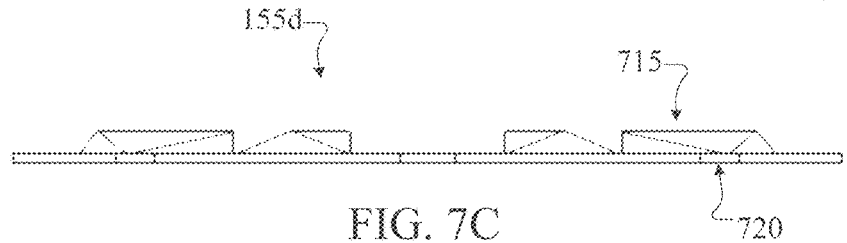

As shown in FIGS. 7A through 7C, a fourth example embodiment of a ground plane 155d is similar in some respects to the ground planes 155a-155c. For example, the ground plane 155d is formed using an annular ring 705 that surrounds an open space 710 within the ring 705. Various projections 720 extend from an outer perimeter of the ring 705, and each projection 720 includes an opening 725. Each opening 725 allows one of the connectors 165 to pass through the associated projection 720, which allows the base 160 to be attached to the outer cone 105 and helps secure the ground plane 155d in place. Note, however, that any other suitable mechanism may be used to secure the ground plane 155d in place.

Rather than using holes, the ring 705 here includes various prisms 715, where each prism 715 includes multiple reflective surfaces 716. In some cases, the reflective surfaces 716 may reflect electromagnetic energy at a steeper angle relative to the flat ground plane 155a. This can help to trap electromagnetic energy within the geodesic antenna 100 that might otherwise form secondary geodesic rays. Also or alternatively, the reflective surfaces 716 may reflect electromagnetic energy that would otherwise form secondary geodesic rays in a desired direction that helps to increase the gain of one or more primary geodesic rays. In some embodiments, each prism 715 can be positioned so that it is substantially equidistant or centered between two of the driven elements 150 once the ground plane 155d is secured to the outer and inner cones 105, 110 by the base 160, and the number of prisms 715 and the positions of the prisms 715 can vary based on the number and positions of the driven elements 150. However, any other suitable number and positions of the prisms 715 may be used here. In this particular example, each prism 715 is formed as a generally triangular prism structure with rounded corners and a shorter edge that is slightly curved. However, each prism 715 may have any other suitable form.

Note that each of the prisms 715 may be formed integral with the ring 705 or formed separately from and attached to the ring 705. For example, the ring 705 and the prisms 715 may be formed by machining a single piece of material or by using an additive manufacturing process, in which case the prisms 715 would be integral with the ring 705. In other cases, the ring 705 and prisms 715 may be formed separately, and the prisms 715 can be welded, bonded, or otherwise attached to the ring 705. Also note that while the prisms 715 here are shown as having two primary reflective surfaces 716, other forms for the prisms 715 may be used, such as those with more than two reflective surfaces 716. Also, each individual prism 715 may be replaced using multiple separated angled reflective surfaces.

Although FIGS. 4A through 7C illustrate examples of modified ground planes 155a-155d that increase gains in element patterns of geodesic antennas, various changes may be made to FIGS. 4A through 7C. For example, a combination of any of the features of two or more of the ground planes 155a-155d may be used in a single ground plane, such as when both prisms on and openings in an annular ring are used in the ground plane. Also, the ground planes 155a-155d shown here are merely meant to represents examples of ground planes that have been geometrically modified (relative to a simply flat annular ground plane) in order to suppress the generation of secondary geodesic rays that can create interferometer patterns or otherwise cause problems in a geodesic antenna. Other suitable ground planes may be produced using other suitable geometric modifications while still falling within the scope of this disclosure.

Figure 8A:
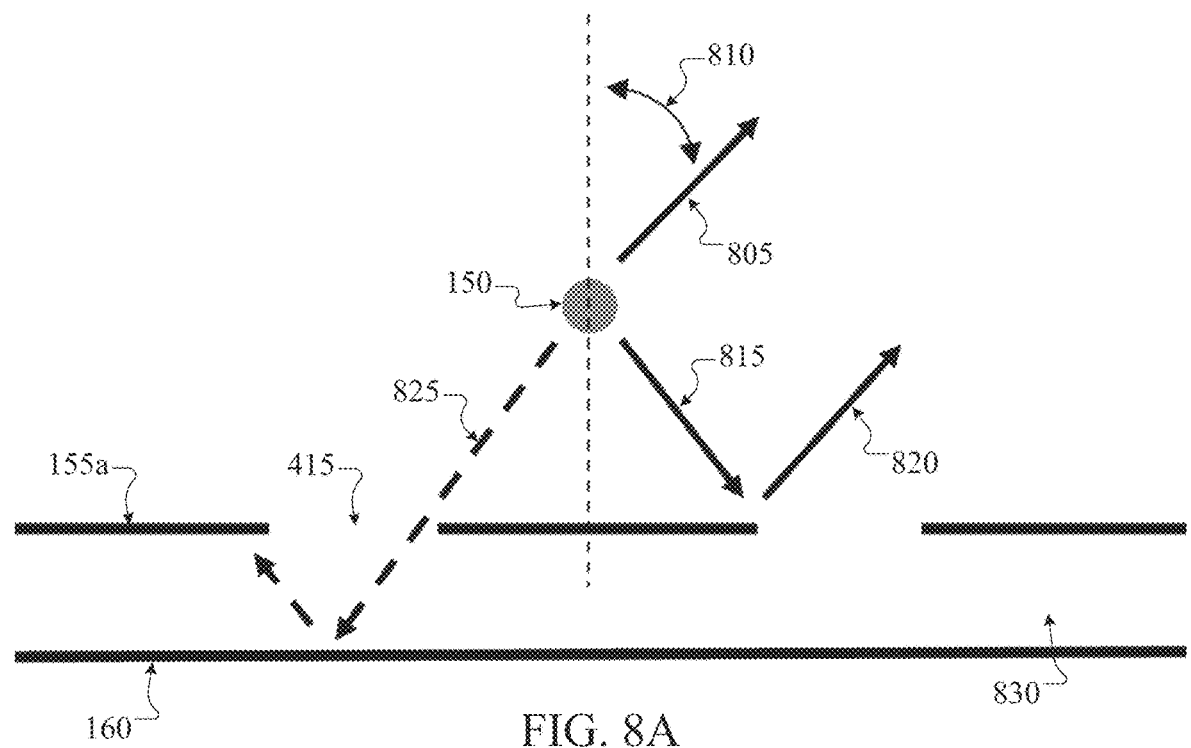
FIGS. 8A and 8B illustrate example operations of geodesic antennas with modified ground planes in accordance with this disclosure.
Figure 8B:
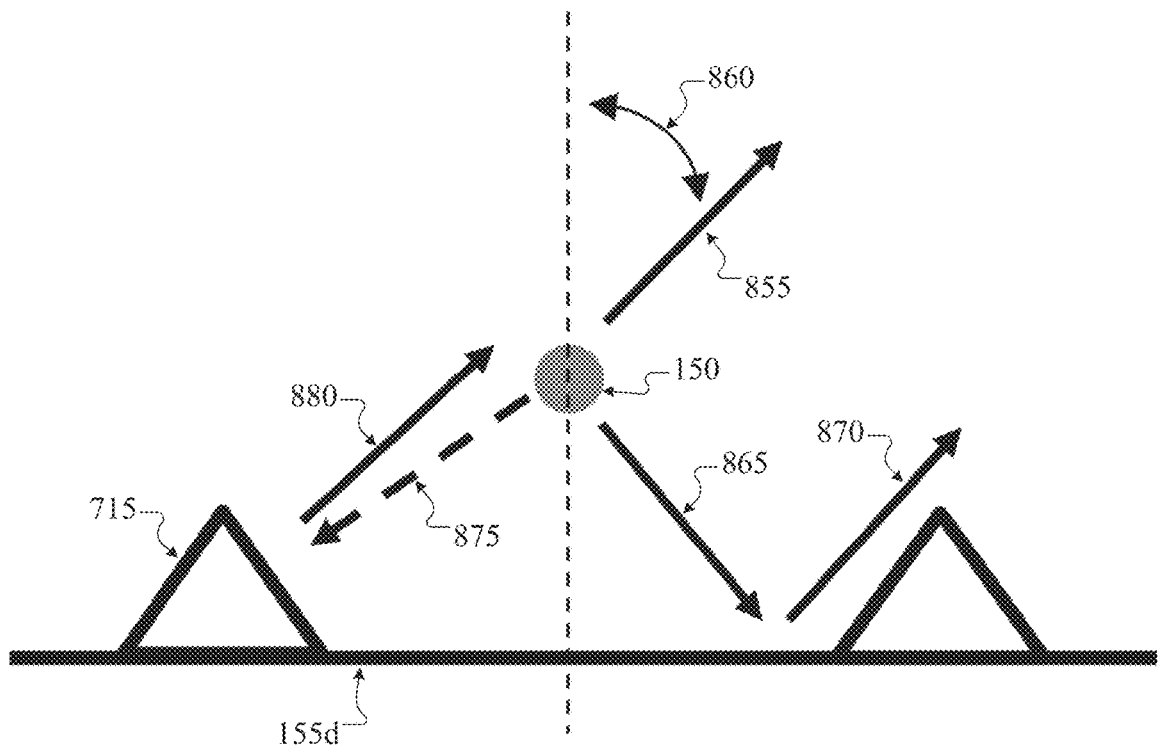

FIGS. 8A and 8B illustrate example operations of geodesic antennas with modified ground planes in accordance with this disclosure. More specifically, FIG. 8A illustrates example operation of the geodesic antenna 100 with the ground plane 155a, and FIG. 8B illustrates example operation of the geodesic antenna 100 with the ground plane 155d. For ease of explanation, the operations shown in FIGS. 8A and 8B are described as involving the geodesic antenna 100 of FIGS. 1 through 3. However, the ground planes 155a-155d or other ground planes designed in accordance with this disclosure may be used in any other suitable geodesic antennas.

As shown in FIG. 8A, a driven element 150 can produce a primary geodesic ray 805, which can have a maximum scan angle 810 relative to a vertical axis through the driven element 150. The driven element 150 can also produce a secondary ray 815, which can be reflected from a planar portion of the ground plane 155a as a secondary geodesic ray 820. Here, the secondary geodesic ray 820 is directed in the same or similar direction as the primary geodesic ray 805, which is desirable and helps to increase the gain of the geodesic antenna 100.

The driven element 150 can further produce an additional secondary ray 825, which can represent an undesirable ray since it may lead to an interferometer pattern or other problem. Here, the secondary ray 825 passes through one of the openings 415 in the ground plane 155a and into a space 830 that is defined between the ground plane 155a and the base 160. The secondary ray 825 here can reflect one or more times and ideally be terminated. As a result, this helps to diminish the interferometer pattern of the geodesic antenna 100 using the ground plane 155a.

As shown in FIG. 8B, a driven element 150 can produce a primary geodesic ray 855, which can have a maximum scan angle 860 relative to a vertical axis through the driven element 150. The driven element 150 can also produce a secondary ray 865, which can be reflected from a planar portion of the ground plane 155d as a secondary geodesic ray 870. Here, the secondary geodesic ray 870 is directed in the same or similar direction as the primary geodesic ray 855, which is desirable and helps to increase the gain of the geodesic antenna 100.

The driven element 150 can further produce an additional secondary ray 875, which can represent an undesirable ray since it may lead to an interferometer pattern or other problem. Here, the secondary ray 875 reflects from a prism 715 on the ground plane 155d as a secondary geodesic ray 880. Depending on the angle of reflection, the secondary geodesic ray 880 may be directed in the same or similar direction as the primary geodesic ray 855 (which is desirable and helps to increase the gain of the geodesic antenna 100) or at an angle steeper than the scan angle. As a result, this helps to diminish the interferometer pattern of the geodesic antenna 100 using the ground plane 155d.

Although FIGS. 8A and 8B illustrate examples of operations of geodesic antennas 100 with modified ground planes 155a, 155d, various changes may be made to FIGS. 8A and 8B. For example, the operations of the geodesic antennas 100 have been simplified here in order to illustrate how the ground planes 155a, 155d may be used to increase the gains in the element patterns of the geodesic antennas 100. As a particular example, the driven elements 150 can generate a number of rays in various directions.

Figure 9A:
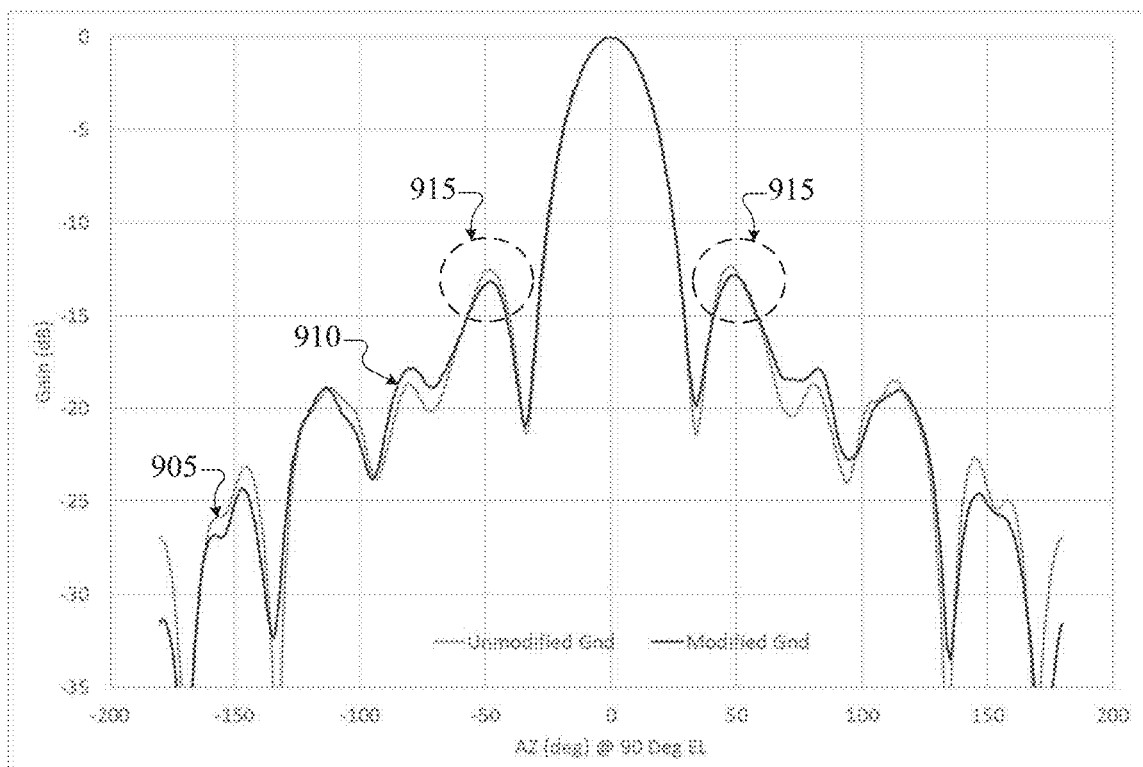
FIGS. 9A and 9B illustrate example benefits obtainable using modified ground planes that increase gains in element patterns of geodesic antennas in accordance with this disclosure.
Figure 9B:
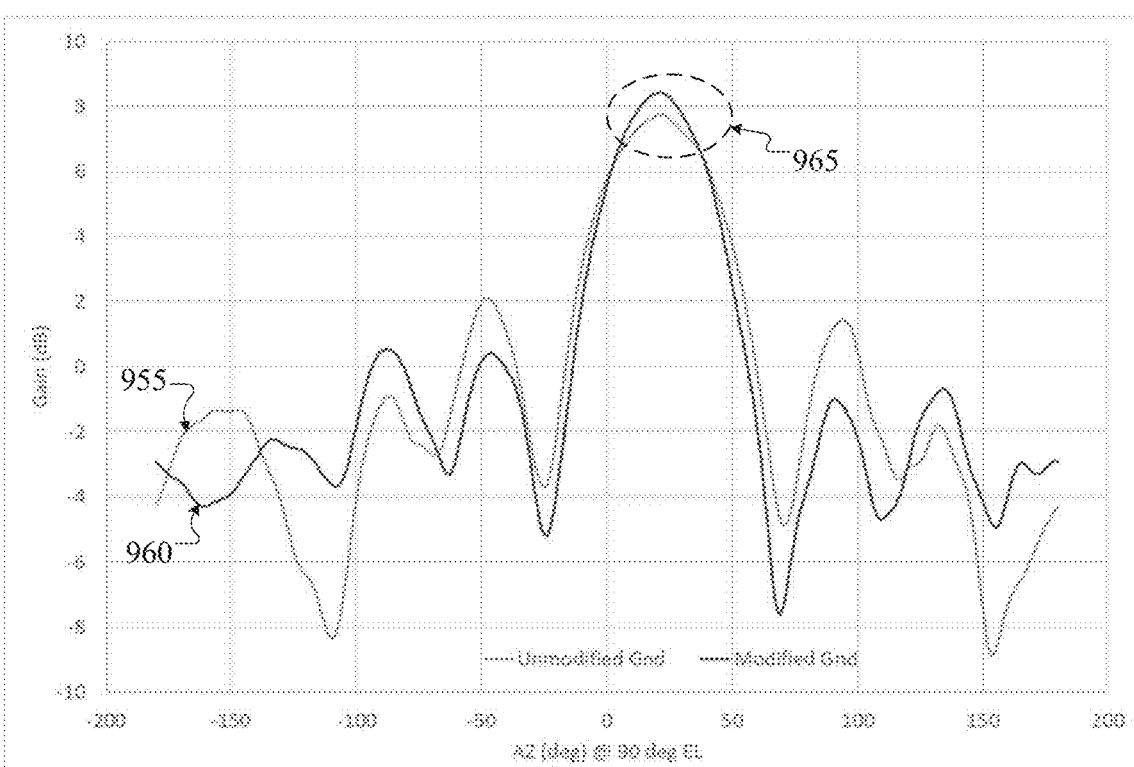

FIGS. 9A and 9B illustrate example benefits obtainable using modified ground planes that increase gains in element patterns of geodesic antennas in accordance with this disclosure. More specifically, FIG. 9A illustrates an example normalized gain plot 900 showing side lobe performance for a geodesic antenna 100 using a modified ground plane, and FIG. 9B illustrates an example gain plot 950 for a geodesic antenna 100 using a modified ground plane.

As shown in FIG. 9A, a line 905 represents the normalized gain of a geodesic antenna using a conventional flat annular ground plane, and a line 910 represents the normalized gain of a geodesic antenna 100 using one of the modified ground planes described above. As can be seen in regions 915 of the plot 900, the use of the modified ground plane helps to improve the gain seen at the side lobes of an output beam being generated by the geodesic antenna 100. In this particular example, the improvement in the gain may be about one decibel, although other improvements may be obtained based on (among other things) the design of the ground plane used in the geodesic antenna 100.

As shown in FIG. 9B, a line 955 represents the gain of a geodesic antenna using a conventional flat annular ground plane, and a line 960 represents the gain of a geodesic antenna 100 using one of the modified ground planes described above. As can be seen in a region 965 of the plot 950, the use of the modified ground plane helps to improve the gain of the output beam being generated by the geodesic antenna 100. In this particular example, the improvement in the gain may be about one decibel, although other improvements may be obtained based on (among other things) the design of the ground plane used in the geodesic antenna 100.

Although FIGS. 9A and 9B illustrate examples of benefits obtainable using modified ground planes that increase gains in element patterns of geodesic antennas, various changes may be made to FIGS. 9A and 9B. For instance, the benefits shown in FIGS. 9A and 9B are for illustration only and merely meant to identify example types of benefits that might be obtained using modified ground planes that increase gains in element patterns of geodesic antennas. The actual benefits obtained in any particular geodesic antenna using any particular ground plane can vary based on a number of factors.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A geodesic antenna comprising:
an outer cone;
an inner cone positioned partially within the outer cone and, together with the outer cone, defining an electromagnetic waveguide;
multiple driven elements configured to generate electromagnetic waves in a space between the outer and inner cones; and
a ground plane configured to reflect first electromagnetic waves of the generated electromagnetic waves back into the space between the outer and inner cones, the ground plane having a geometric design that prevents at least some second electromagnetic waves of the generated electromagnetic waves from being reflected from the ground plane and forming an interferometer pattern;
wherein the ground plane comprises:
an annular ring; and
multiple openings positioned along and through the annular ring.

2. The geodesic antenna of Claim 1, wherein the multiple openings are positioned along the annular ring such that each opening is positioned to directly receive electromagnetic waves generated by two of the driven elements.

3. The geodesic antenna of Claim 1, wherein the ground plane further comprises multiple raised walls extending from the annular ring.

4. The geodesic antenna of claim 3, wherein the multiple raised walls comprise two raised walls positioned on opposite sides of each opening.

5. The geodesic antenna of claim 3, wherein the multiple raised walls comprise a raised wall encircling each opening.

6. The geodesic antenna of Claim 1, further comprising:
a base configured to secure the ground plane to the outer and inner cones, the base also configured to receive and terminate at least some of the second electromagnetic waves that pass through the openings of the ground plane.

7. The geodesic antenna of claim 1, further comprising:
a base configured to secure the ground plane to the outer and inner cones, the base also configured to be coupled to and removed from the outer and inner cones in order to allow replacement of the ground plane with another ground plane having a different geometric design.

8. The geodesic antenna of claim 7, wherein the ground plane comprises a central opening configured to allow passage of a portion of the base through the ground plane.

9. A geodesic antenna comprising:
an outer cone;
an inner cone positioned partially within the outer cone and, together with the outer cone, defining an electromagnetic waveguide;
multiple driven elements configured to generate electromagnetic waves in a space between the outer and inner cones; and
a ground plane configured to reflect first electromagnetic waves of the generated electromagnetic waves back into the space between the outer and inner cones, the ground plane having a geometric design that prevents at least some second electromagnetic waves of the generated electromagnetic waves from being reflected from the ground plane and forming an interferometer pattern;
wherein the ground plane comprises:
planar portions configured to reflect the first electromagnetic waves back into the space between the outer and inner cones; and
multiple angled surfaces configured to reflect at least some of the second electromagnetic waves back into the space between the outer and inner cones; and
wherein each angled surface comprises a triangular surface having:
a first corner positioned closer to a center of the ground plane, the first corner positioned above the planar portions of the ground plane;
a second corner positioned further from the center of the ground plane, the second corner positioned above the planar portions of the ground plane; and
a third corner positioned further from the center of the ground plane, the third corner lower than the first and second corners.

10. The geodesic antenna of claim 9, wherein the ground plane comprises multiple prisms forming the angled surfaces.

11. The geodesic antnna of claim 10, wherein:
the ground plane comprises an annular ring; and
the prisms are positioned along the annular ring.

12. The geodesic antenna of claim 11, wherein the multiple prisms are positioned along the annular ring such that each prism is positioned to directly receive electromagnetic waves generated by two of the driven elements.

13. The geodesic antenna of claim 9, wherein the multiple angled surfaces are configured to reflect at least some of the second electromagnetic waves in substantially a same direction as the first electromagnetic waves.

14. The geodesic antenna of claim 9, wherein the multiple angled surfaces are configured to reflect at least some of the second electromagnetic waves at an angle that is steeper than a scan angle of the geodesic antenna.

15. A method comprising:
generating electromagnetic waves in a space between outer and inner cones of a geodesic antenna; and
using a ground plane of the geodesic antenna to reflect first electromagnetic waves of the generated electromagnetic waves back into the space between the outer and inner cones, the ground plane having a geometric design that prevents at least some second electromagnetic waves of the generated electromagnetic waves from being reflected from the ground plane and forming an interferometer pattern;
wherein:
the ground plane comprises multiple openings that allow at least some of the second electromagnetic waves to pass through the ground plane; and
a base of the geodesic antenna terminates at least some of the second electromagnetic waves that pass through the ground plane.

16. The method of Claim 15, wherein:
the ground plane further comprises multiple walls at least partially surrounding the openings; and
the walls are configured to at least one of:
reflect at least some of the second electromagnetic waves into the openings; and
reflect at least some of the second electromagnetic waves at an angle that is steeper than a scan angle of the geodesic antenna.

17. The method of claim 16, wherein one of:
the multiple walls comprise two raised walls positioned on opposite sides of each opening; or
the multiple walls comprise a raised wall encircling each opening.

18. A method comprising:
generating electromagnetic waves in a space between outer and inner cones of a geodesic antenna; and
using a ground plane of the geodesic antenna to reflect first electromagnetic waves of the generated electromagnetic waves back into the space between the outer and inner cones, the ground plane having a geometric design that prevents at least some second electromagnetic waves of the generated electromagnetic waves from being reflected from the ground plane and forming an interferometer pattern;
wherein the ground plane comprises multiple angled surfaces that reflect at least some of the second electromagnetic waves back into the space between the outer and inner cones; and
wherein each angled surface comprises a triangular surface having:
a first corner positioned closer to a center of the ground plane, the first corner positioned above planar portions of the ground plane;
a second corner positioned further from the center of the ground plane, the second corner positioned above the planar portions of the ground plane; and
a third corner positioned further from the center of the ground plane, the third corner lower than the first and second corners.

19. The method of claim 18, wherein the ground plane comprises multiple prisms forming the angled surfaces.

20. The method of claim 19, wherein the multiple prisms are positioned along an annular ring such that each prism is positioned to directly receive electromagnetic waves generated by two driven elements of the geodesic antenna.

* * * * *